United States Patent
Rambach et al.

(10) Patent No.: US 9,730,219 B2
(45) Date of Patent: Aug. 8, 2017

(54) METHOD FOR DETERMINING A TIME MULTIPLEXING SEQUENCE FOR A MIMO RADAR

(71) Applicant: Robert Bosch GmbH, Stuttgart (DE)

(72) Inventors: Kilian Rambach, Stuttgart (DE); Markus Karl Vogel, Hausen im Wiesental (DE)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 14/667,097

(22) Filed: Mar. 24, 2015

(65) Prior Publication Data
US 2015/0295628 A1    Oct. 15, 2015

(30) Foreign Application Priority Data
Apr. 10, 2014   (DE) .................. 10 2014 206 927

(51) Int. Cl.
| | |
|---|---|
| H04W 4/00 | (2009.01) |
| H04W 72/04 | (2009.01) |
| H04B 7/0413 | (2017.01) |
| H04B 7/06 | (2006.01) |
| G01S 7/282 | (2006.01) |
| G01S 13/10 | (2006.01) |
| G01S 13/42 | (2006.01) |
| G01S 13/93 | (2006.01) |

(52) U.S. Cl.
CPC ......... *H04W 72/0446* (2013.01); *G01S 7/282* (2013.01); *G01S 13/10* (2013.01); *G01S 13/42* (2013.01); *G01S 13/931* (2013.01); *H04B 7/0413* (2013.01); *H04B 7/0691* (2013.01)

(58) Field of Classification Search
CPC .................. H04W 72/0473; H04W 72/0446
USPC ........................................ 370/329
See application file for complete search history.

(56) References Cited

U.S. PATENT DOCUMENTS

| | | | | |
|---|---|---|---|---|
| 4,885,590 A * | 12/1989 | Hasan | ..................... | G01S 13/87 342/160 |
| 5,949,367 A * | 9/1999 | Trompf | ..................... | G01S 7/417 342/90 |
| 6,150,972 A * | 11/2000 | Bickel | ................. | G01S 13/9023 342/190 |
| 6,313,795 B1 * | 11/2001 | Herrmann | ................. | G01S 3/48 342/156 |
| 2010/0321234 A1 * | 12/2010 | Goldman | ............ | G01S 13/9029 342/25 A |
| 2010/0321239 A1 * | 12/2010 | Rossi | .................... | G01S 5/0268 342/387 |
| 2011/0254726 A1 * | 10/2011 | Molin | ................... | G01S 7/2923 342/95 |

(Continued)

*Primary Examiner* — Farah Faroul
(74) *Attorney, Agent, or Firm* — Norton Rose Fulbright US LLP; Gerard Messina (57) ABSTRACT

For providing time multiplexing sequences for transmit antennas of a linear or two-dimensional MIMO radar unit that includes antennas situated close to one another (collocated MIMO radar), a method that enables a precise angle estimation includes implementing an algorithm with which a transmit sequence of transmitters and their transmit times are determined so that object movements have essentially no influence on the angle estimation. In this way, as a function of previously known quantities, optimal time multiplexing sequences can be determined in each case.

16 Claims, 3 Drawing Sheets

(56) References Cited

U.S. PATENT DOCUMENTS

2012/0127021 A1* 5/2012 Gravelle ................ G01S 7/023
 342/130
2012/0268308 A1* 10/2012 Tuttle .................... G01S 13/282
 342/42

* cited by examiner

METHOD FOR DETERMINING A TIME MULTIPLEXING SEQUENCE FOR A MIMO RADAR

FIELD OF THE INVENTION

The present invention relates to a method for determining a time multiplexing sequence for a MIMO radar unit. The present invention also relates to a MIMO radar unit.

BACKGROUND

In motor vehicles, radar systems are increasingly used in order to determine distances and relative speeds of objects in the vicinity of the motor vehicle. The named radar systems can be used to realize convenience functions (such as adaptive cruise control, or ACC) and safety functions (such as warning the driver in critical situations, or causing a full braking of the vehicle if an impact can no longer be avoided).

For these applications, the distance and relative speed of the objects, and the angle of the reflected radar waves, have to be determined precisely. In particular, the estimation of the angle, or direction of arrival (DOA), has to be carried out precisely for this purpose. The angle to be estimated can be an azimuth angle and/or an elevation angle. Compared to conventional single-input multiple-output (SIMO) radar systems, multiple-input multiple-output (MIMO) radar systems offer the advantage of a larger virtual aperture at the same or smaller geometrical size. Therefore, normally a greater precision of the estimated DOA can be achieved using an MIMO radar unit.

In general, however, the precision of DOA estimations in an MIMO radar unit decreases if the object is moving relative to the radar unit, because the movement produces an unknown phase shift (Doppler phase) of the base band signal, due to the Doppler effect.

Feger et al., "A 77-GHz FMCW MIMO Radar based on a SiGe Single-Chip Transceiver" (2009) discloses a MIMO radar unit in which receive and transmit antennas are positioned such that at least two antenna elements of a virtual array have the same geometrical position (redundant position). An unknown phase shift (Doppler phase) of the base band signal due to a target movement is estimated by calculating the phase difference of the antenna elements at the redundant positions. The estimated Doppler phase is subsequently used as a correction in an algorithm for the angle estimation.

However, in order to determine the unknown Doppler phase, only antenna elements at the redundant positions are used. Subsequently, all antenna elements are used to determine the angle at which the signal arrives. Therefore, a noise of the antenna elements at the redundant positions has a greater influence on the DOA estimation than does a noise at the rest of the antenna elements. As a function of the time multiplexing schema used, and of the configuration of the antennas, a DOA estimation of such a system can even be worse than with the use of a single transmit antenna.

Wintermantel, "Radar System with Elevation Measuring Capability" (2010) discloses a MIMO radar system having a plurality of transmit and receive antennas. The transmit antennas transmit numerous chirp sequences of short duration, for example 512 or 1024 chirps each with a duration of, for example, 10 μs. The transmitters transmit sequentially or simultaneously, but with different phase modulations. The distance, the relative speed, and the DOA are estimated using a three-dimensional discrete Fourier transform. In particular, in the case of a plurality of objects having the same distance and the same relative speed, the proposed system can carry out only imprecise angle estimations, and in addition cannot be used at all with a frequency-modulated continuous wave (FMCW) radar having long ramps. In addition, due to the chirp sequence design with rapid frequency changes, the hardware is relatively complex and expensive to realize.

SUMMARY

Therefore, an object of the present invention is to provide an improved method for determining a time multiplexing sequence for a MIMO radar unit.

According to a first aspect, the object is achieved by a method for determining a time multiplexing sequence for a MIMO radar that includes a plurality of transmit antennas. In the case where the plurality of transmit antennas includes more than two transmit antennas, the method is applied to the two of the plurality of transmit antennas whose distance from one another is the maximum of any other pair of the plurality of transmit antennas. The transmit energy of each pulse of the time multiplexing sequence transmitted by the two transmit antennas is essentially the same, a number and a transmit duration of the pulses are defined. Transmit times of the pulses are configured to be essentially equidistant, and the transmit times of the pulses are selected as follows, without limitation of generality: $t_i = i - (N+1)/2$, where $1 \leq i \leq N$, and where the parameters are defined as follows:

I . . . index
$t_i$ . . . ith transmit time of the transmit antennas
N . . . number of pulses.

The indices of the transmit times of transmit antenna $TX_1$ are determined iteratively from the following mathematical equations:

$$I_{LB} := I_{LB}, \text{ if } I_{LB} > i\max$$

$$I_{LB} := i_{max} + 1 \text{ otherwise}$$

$$I_{LB} = \lceil \sigma - \sigma_{M-1} + \tfrac{1}{2} \cdot (1 + (K-M) \cdot (K-M-N) + N) \rceil$$

$$I_{UB} = \lfloor (\sigma - \sigma_{M-1})/(K+1-M) - (K-1-M-N)/2 \rfloor$$

where the parameters are defined as follows:
$i_{max}$ . . . largest previously selected index, with $i_{max}=0$ at the beginning of the algorithm
$I_{LB}$ . . . minimum index of the transmit time
$I_{UB}$ . . . maximum index of the transmit time
t . . . transmit times
K . . . number of pulses transmitted via first transmit antenna TX1
M . . . current iteration
σ . . . sum of the transmit times of the first transmit antenna
$\sigma_{M-1}$ . . . sum over the transmit times of the first transmit antenna after iteration M−1
⌈ ⌉ . . . "rounding up" to the next largest whole number
⌊ ⌋ . . . "rounding down" to the next smallest whole number, where σ and K are determined relative to N from the following table:

| N | σ | K |
|---|---|---|
| 4K | 0 | N/2 |
| 2 + 4K | ±½ | N/2 |
| 1 + 2K | 0 | (N ± 1)/2 |

The transmit times of transmit antenna $TX_2$ occur at the times at which transmit antenna $TX_1$ is not transmitting.

Advantageously, in this way it is possible to determine the sequence in which the transmit antennas transmit. An angle estimation is advantageously possible with great precision using the determined sequences. As a result, using the method according to the present invention a transmit sequence is determined for the two transmit antennas that are used, the transmit sequence defining when which pulse is transmitted by which transmit antenna.

According to a second aspect, the object is achieved by a method for determining a time multiplexing sequence for a MIMO radar unit that includes a plurality of transmit antennas, where, according to the method, a number of pulses, transmit powers, and transmit durations of the transmit antennas are defined; in the case of more than two transmit antennas, the two transmit antennas whose distance from one another is the maximum of all pairs of the plurality of antennas are used; the pulses are divided between the transmit antennas in such a way that the magnitude of the difference between the transmit energy radiated via the first transmit antenna and the transmit energy radiated via the second transmit antenna is the minimum; a time multiplexing schema that provides a transmit sequence and transmit times of the transmit antennas is determined from the following mathematical equation $[1 \ (\underline{1}^T \underline{\rho}^{(1)}) \cdot (\underline{\rho}^{(1)})^T - 1/(\underline{1}^T \underline{\rho}^{(2)}) \cdot (\underline{\rho}^{(2)})^T] \cdot \underline{t} = 0$; and determining from the determined sequences, those that have the shortest overall transmit time, where the parameters of the equation are defined as follows:

$\underline{\rho}^{(1)}$ . . . transmit energies of the pulses radiated via first transmit antenna $TX_1$, the ith element of $\underline{\rho}^{(1)}$ designating the energy of the ith transmitted pulse $\underline{\rho}^{(2)}$ . . . transmit energies of the pulses radiated via second transmit antenna $TX_2$ $\underline{1}$ . . . vector all the elements of which equal to 1

$\underline{1}^T \underline{\rho}^{(1)}$ . . . sum over all elements in $\underline{\rho}^{(1)}$ $\underline{1}^T \underline{\rho}^{(2)}$ . . . sum over all elements in $\underline{\rho}^{(2)}$ $\underline{t}$ . . . transmit times In this way, it is advantageously possible to determine a time multiplexing sequence with a minimum transmit duration and that is optimized with regard to angle estimation.

In an example embodiment, in the case in which the number of pulses can be freely selected, a multiple of four is used for the number of pulses. In this way, the realization of the method according to the present invention is possible for an arbitrary number of pulses.

In an example embodiment, a deviation from the equidistance of the transmit times of the pulses is small in relation to the temporal spacing of the transmit times. In this way, it is advantageously supported that, even in the case of an imprecise equidistance of the transmit times of the pulse durations, the method according to the present invention can still be carried out.

In an example embodiment, the partitioning of the pulses to the transmit antennas is carried out by a solution algorithm of a partitioning problem. In this way, the allocation of the pulses to the transmit antennas can be carried out using a method that is well known in informatics.

In an example embodiment, the partitioning of the pulses to the transmit antennas is carried out by an approximation algorithm with a polynomial runtime. Under some circumstances, this algorithm does not always yield the best solution, but, on the other hand, it has a significantly shorter runtime, and is therefore advantageous in particular for larger numbers of pulses.

In the following, the present invention is described in detail with further features and advantages, on the basis of the figured. All described or represented features, in themselves or in arbitrary combination, form the subject matter of the present invention, independent of their summarization in the patent claims or their relations of dependence, and independent of their formulation or representation in the description or in the drawings. Known principles of a MIMO radar unit are not described in more detail.

DETAILED DESCRIPTION

In order to be able to make use of the advantages of MIMO radar, the transmit signals of the transmit antennas of the MIMO radar that are used should preferably be orthogonal to one another. To achieve this, in principle there are three possibilities, which however each have specific disadvantages: code multiplexing, in fast or slow time, has a high technical outlay, or has only limited orthogonality; frequency multiplexing causes a phase and Doppler shift, as a function of the wavelength; and time multiplexing results in different phases when there are object movements between changeovers, making the subsequent angle estimation more difficult. In the following, only the time multiplexing method is examined in more detail, because it is comparatively easy to realize in terms of circuitry, and is therefore economical. According to example embodiments of the present invention, a time multiplexing wiring design is provided that is distinguished in that object movements between changeovers of the transmitter do not have any influence on the subsequent angle estimation.

The received basis band radar signal is described by a mathematical model, the Cramer-Rao bound (CRB) being calculated for the angle estimation. In principle, this bound represents the maximum possible precision that can be achieved with an unbiased angle estimator, and is therefore independent of the evaluation algorithm that is used. From the Cramer-Rao bound, a condition is derived between the positions of transmit antennas $TX_1 \ldots TX_N$, the transmit sequence, and the transmit times, that should be met in order to enable an angle estimation that is as precise as possible.

From this modeling, various optimal time multiplexing schemata can then be derived. In the angle estimation, not only the phase differences in the base band signals resulting from the angle, but also the phase differences resulting from the Doppler effect, are taken into account. The transmit times and positions of the respectively transmitting transmit antennas $TX_1 \ldots TX_N$ are selected such that the transmit positions of the transmit antennas $TX_1 \ldots TX_N$ are as uncorrelated as possible in the sequence in which they transmit and in their transmit times. In this way, for the angle estimation, a degree of precision is achieved that is exactly as great as when the target object does not move at all relative to the radar. Advantageously, this design can be used both for an elevation angle estimation and for an azimuth angle estimation. As a result, in this way a technical potential of the MIMO radar unit can advantageously be exploited as well as possible.

Without limitation of generality, for the ith transmit time, the following mathematical equation holds:

$$t_i = i - (N+1)/2, 1 \leq i \leq N \quad (1)$$

with the parameters:
I . . . index
$t_i$ . . . ith transmit time of the transmit antennas
N . . . number of pulses.

Thus, for example, for N=5, the corresponding transmit times would be given by: $t_1=-2$, $t_2=-1$, $t_3=0$, $t_4=1$, $t_5=2$.

If the algorithm is in the Mth iteration, then a minimum index $I_{LB}$ (lower bound) and a maximum index $I_{UB}$ (upper bound) of the transmit times can be determined at which first transmit antenna $TX_1$ is permitted to transmit as the next transmitting antenna. This means that all transmit times between $t_{I\_LB}$ and $t_{I\_UB}$ can be used as Mth transmit time. The corresponding index limits $I_{LB}$, $I_{UB}$ of the transmit times of transmit antenna $TX_1$ can be determined from the following mathematical equations:

$$I_{LB} := I_{LB}, \text{ if } I_{LB} > i_{max} \quad (2)$$

$$I_{LB} := i_{max} + 1 \text{ otherwise} \quad (3)$$

where $$I_{LB} = \lceil \sigma - \sigma_{M-1} + \tfrac{1}{2} \cdot (1 + (K-M) \cdot (K-M-N) + N) \rceil \quad (4)$$

$$I_{UB} = \lfloor (\sigma - \sigma_{M-1})/(K+1-M) - (K-1-M-N)/2 \rfloor \quad (5)$$

where the parameters are defined as follows:
$i_{max}$ . . . largest previously selected index, with $i_{max}=0$ at the beginning of the algorithm
$I_{LB}$ . . . minimum index of the transmit time
$I_{UB}$ . . . maximum index of the transmit time
t . . . transmit times
K . . . number of pulses transmitted via first transmit antenna TX1
M . . . current iteration
N . . . number of pulses
σ . . . sum of the transmit times of the first transmit antenna
$\sigma_{M-1}$ . . . sum over the transmit times of the first transmit antenna $TX_1$ after iteration M−1
⌈ ⌉ . . . "rounding up" to the next largest whole number
⌊ ⌋ . . . "rounding down" to the next smallest whole number,
where σ and K are determined relative to N from the following table:

TABLE 1

| N | σ | K |
|---|---|---|
| 4K | 0 | N/2 |
| 2 + 4K | ±½ | N/2 |
| 1 + 2K | 0 | (N ± 1)/2 |

All the time multiplexing sequences that are optimal for the angular estimation can be determined by solving equations (1) through (5). The algorithm iteratively determines the possible transmit times of first transmit antenna $TX_1$. In this context, "iteratively" means that first all possible first transmit times of first transmit antenna $TX_1$ are determined, for each first transmit time, in the subsequent iteration all possible second transmit times of first transmit antenna $TX_1$ are then determined, etc. This is repeated until the corresponding number of transmit times has been determined. The transmit times of second transmit antenna $TX_2$ thus result as those times at which first transmit antenna $TX_1$ is not transmitting. These times therefore no longer have to be determined separately.

Figure 1:
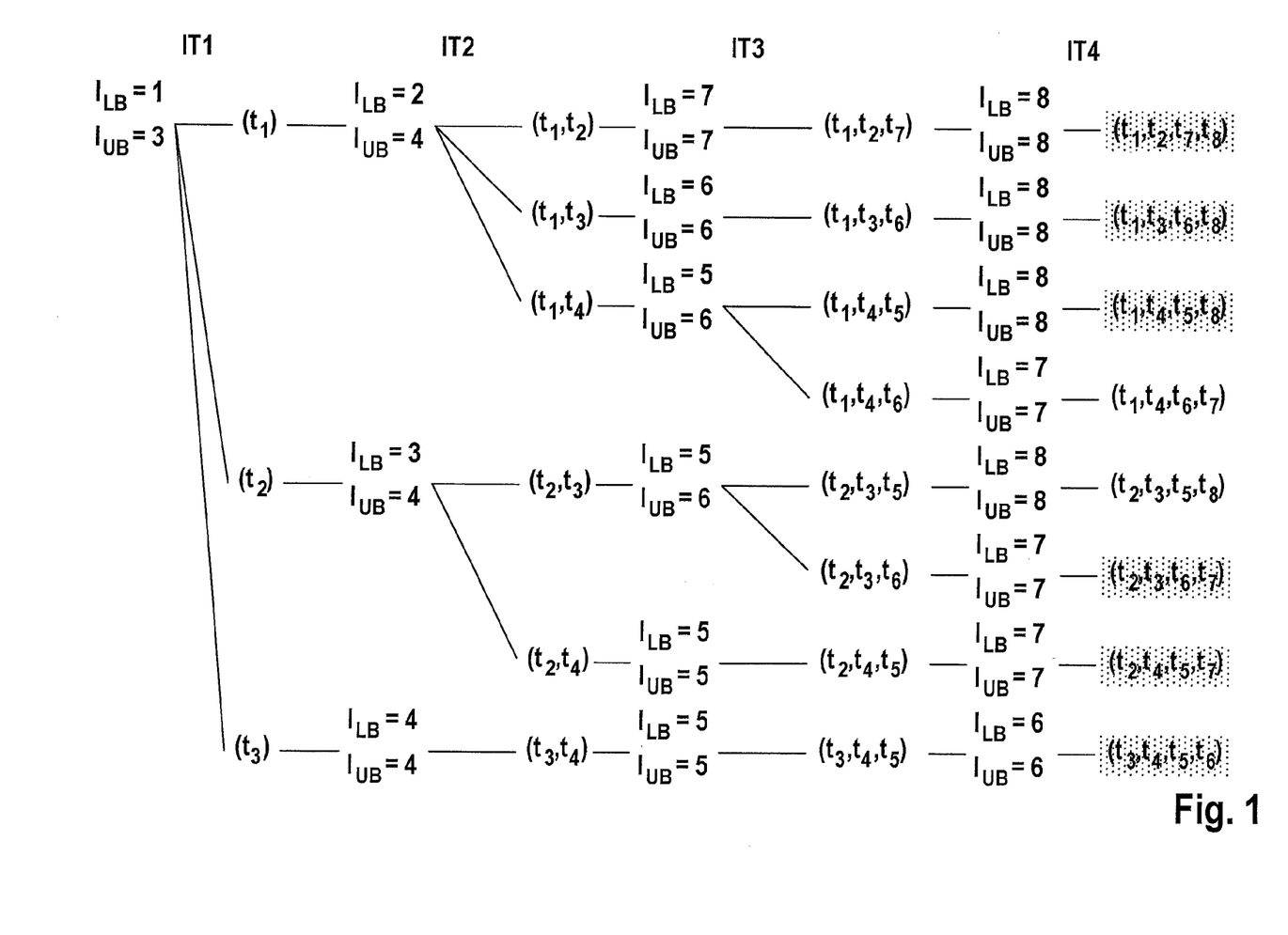
FIG. 1 shows a graphic representation of the functioning of a determination of a time multiplexing sequence according to an example embodiment of the present invention.

For better understanding, FIG. 1 shows a principle of operation of the described algorithm, in a graphic representation.

Shown is a schematic sequence of the algorithm for a total of eight pulses $P_1 \ldots P_8$ determined from four iterations IT1 through IT4. In first iteration IT1, all possible first transmit times of first transmit antenna $TX_1$ are determined. It can be seen that after first iteration IT1, indices of possible transmit times of first transmit antenna $TX_1$ are one, two, or three. As a result, this means that either the time one, or the time two, or the time three are possible first transmit times for first transmit antenna $TX_1$.

For each of the iteratively determined first transmit times one, two, and three, subsequently, in a second iteration IT2, all possible second transmit times of first transmit antenna $TX_1$ are determined, etc., until, after the fourth iteration IT4, all four transmit times of first transmit antenna $TX_1$ have been determined. At all other times, second transmit antenna $TX_2$ transmits, this sequence resulting automatically because the transmit times of the transmit pulses of the two transmit antennas $TX_1$, $TX_2$ are essentially equidistant. The time multiplexing sequences shown as shaded are distinguished by a particular structure, according to which the two transmit antennas $TX_1$, $TX_2$ transmit equally often, and the sequence is made symmetrically.

After the termination of fourth iteration IT4, there are therefore eight possibilities for the definition of four transmit times of first transmit antenna $TX_1$. In supplementation with the four transmit times of second transmit antenna $TX_2$, there thus result eight possible time multiplexing sequences for the two transmit antennas $TX_1$, $TX_2$, all eight time multiplexing sequences being in principle equivalent.

Figure 2:
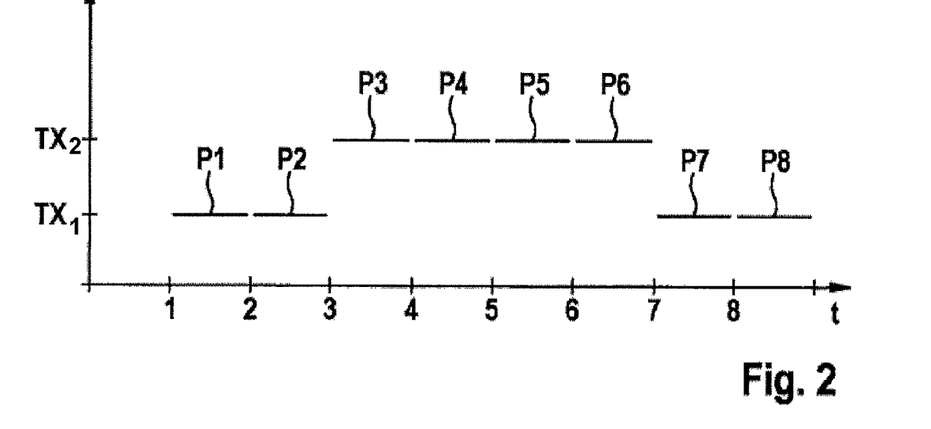
FIG. 2 shows a time multiplexing sequence for a MIMO radar unit according to an example embodiment of the present invention.

FIG. 2 shows such a transmit schema of a time multiplexing sequence with a total of eight pulses $P_1 \ldots P_8$, corresponding to the first result of fourth iteration IT4 of FIG. 1.

Figure 3:
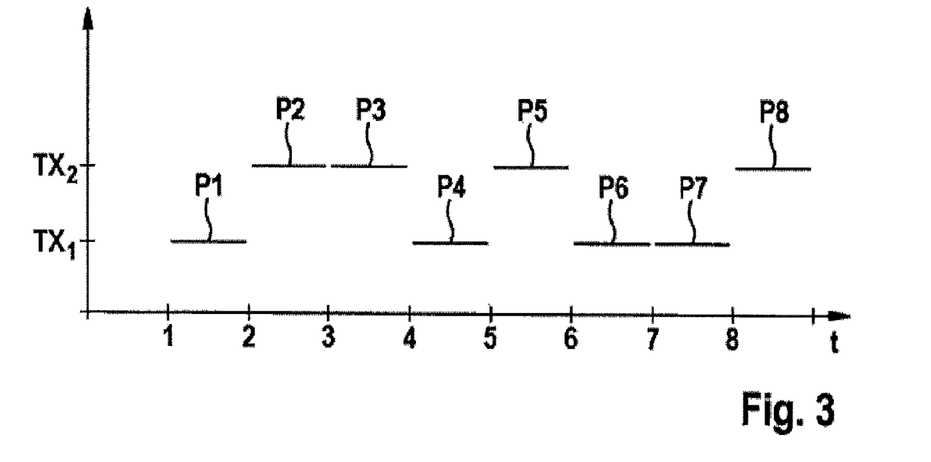
FIG. 3 shows a time multiplexing sequence for a MIMO radar unit according to a further example embodiment of the present invention.

FIG. 3 shows a further transmit schema of this type of a time multiplexing sequence having eight pulses $P_1 \ldots P_8$, corresponding to the fourth result of fourth iteration IT4 of FIG. 1.

In the following, two scenarios are distinguished for which the method according to the present invention can provide optimal time multiplexing sequences.

In a first scenario, each pulse $P_1 \ldots P_N$ has essentially the same transmit energy, the transmit times of the transmit durations of pulses $P_1 \ldots P_N$ being configured essentially equidistant from one another. A certain deviation from this equidistance is possible, which can result in a slightly worsened angle estimation. A number N of transmit pulses $P_1 \ldots P_N$ is specified, determined for example from an optimization of a distance and speed estimation of the MIMO radar unit.

For this scenario, as a function of the total transmitted pulses N, the following optimal time multiplexing sequences can be determined the number N of pulses $P_1 \ldots P_n$ is a natural multiple of four, i.e., N=4, 8, 12, 16, . . . =4k, k∈ℕ;

only two transmit antennas, i.e., those two transmit antennas $TX_1$, $TX_2$, are used whose distance from one another is the maximum, standardly limited by an aperture size of the transmit antennas; and overall, an equal number of pulses are transmitted via the two antennas $TX_1$, $TX_2$.

For the transmit times of first and second transmit antenna $TX_1$ and $TX_2$, in this case the following holds:

$$E^S(\underline{t}^{(1)}) = E^S(\underline{t}^{(2)}) \qquad (6)$$

with the parameters:
$E^S(\underline{x})$ ... mean value of the elements of the vector $\underline{x}$
$\underline{t}^{(1)}$ ... transmit times of first transmit antenna $TX_1$
$\underline{t}^{(2)}$ ... transmit times of first transmit antenna $TX_2$ A certain part of these optimal sequences has the structure that both transmit antennas $TX_1$, $TX_2$ are used equally often, and the time multiplexing sequence is symmetrical to the center of the sequence. This means that two pulses having the same distance from the center of the sequence have to have the same value.

The transmit schema of the time multiplexing sequence of FIG. 2 shows a possible variant that satisfies equation (6).

This sequence indicates that transmit antenna $TX_1$ transmits at the first and second transmit times, transmit antenna $TX_2$ transmits at the third, fourth, fifth, and sixth transmit time, etc. From the example, the symmetry of the sequence can also be seen, the center of the sequence being situated between the fourth and the fifth pulse.

FIG. 3 shows a further possible transmit schema of a time multiplexing sequence that is optimal for the angle estimation, having a pulse number $N=8$.

Although in FIGS. 2 and 3, pulses $P_1 \ldots P_8$ are shown each having the same duration, it is alternatively also possible to use pulses having different transmit durations. In example embodiments, it is ensured that the transmit energy of the pulses are essentially equal.

In a case where the number N of the pulses $P_1 \ldots P_N$ has the form $N=2, 6, 10, 14, \ldots =2+4k$, where $k \in \mathbb{N}$, then all the optimal sequences have the following properties: only two transmit antennas, i.e., those two transmit antennas $TX_1$, $TX_2$, are used whose distance from one another is the maximum; overall, an equal number of pulses $P_1 \ldots P_N$ are sent via the two transmit antennas $TX_1$, $TX_2$; and for the transmit times of first and second transmit antenna $TX_1$, $TX_2$ the following holds:

$$|E^S(\underline{t}^{(1)}) = E^S(\underline{t}^{(2)})| \text{ is a minimum} \qquad (7)$$

A certain portion of these optimal sequences has the structure that the two transmit antennas $TX_1$, $TX_2$ are used equally often; and the time multiplexing sequence is symmetrical to the center of the sequence, except for those elements that are closest to the center of the sequence, which are different from one another. An example of such an optimal time multiplexing sequence having this specific structure is the following sequence: $TX_2$, $TX_1$, $TX_1$, $TX_2$, $TX_1$, $TX_2$, where a total of six pulses $P_1 \ldots P_6$ are transmitted. Here, the two transmit antennas $TX_1$, $TX_2$ are used equally often, and the pulses situated closest to the sequence center, i.e., the pulses three and four, are the single pulses for which there is no symmetry.

Another optimal sequence that does not have this structure is the following sequence: $TX_2$, $TX_1$, $TX_1$, $TX_2$, $TX_2$, $TX_1$.

If the number N of pulses $P_1 \ldots P_N$ is odd, i.e., $N=3, 5, 7, 9, \ldots =2k+1$, $k \in \mathbb{N}$, then the following properties hold for all time multiplexing sequences that are optimal with regard to an angle estimation: only two transmit antennas, i.e., those two transmit antennas $TX_1$, $TX_2$, are used whose distance from one another is the maximum; via one of the transmit antennas $TX_1$, $TX_2$, one more pulse is radiated than is radiated via the other transmit antenna; and for the transmit times of first and second transmit antennas $TX_1$, $TX_2$, the following holds:

$$E^S(\underline{t}^{(1)}) = E^S(\underline{t}^{(2)}) \qquad (8)$$

A certain portion of these time multiplexing sequences that are optimal with regard to angle estimation has the following structure: one of the transmit antennas $TX_1$, $TX_2$ is used one time more than is the other transmit antenna; and the time multiplexing sequence is symmetrical to the center of the sequence.

An example of an optimal time multiplexing sequence having this specific structure is the following sequence: $TX_2$, $TX_2$, $TX_1$, $TX_1$, $TX_1$, $TX_2$, $TX_2$, where a total of seven pulses $P_1 \ldots P_7$ are transmitted. Here, transmit antenna $TX_2$ is used one time more than is transmit antenna $TX_1$. The sequence is symmetrical to element four, which corresponds to the center of the sequence.

Another time multiplexing sequence which is optimal with regard to angle estimation is the following sequence: $TX_2$, $TX_1$, $TX_1$, $TX_2$, $TX_2$, $TX_2$, $TX_1$.

For a case in which the number of pulses N can be selected freely, the time multiplexing sequence that is optimal with regard to angle estimation is obtained if the number of pulses N is a multiple of four, i.e., $N=4k$, $k \in \mathbb{N}$, and one of the time multiplexing sequences identified above as optimal is used.

In a second scenario, a case can occur in which the number of pulses N and the transmit powers and transmit durations of transmit antennas $TX_1, \ldots TX_N$ are already specified, because they were determined or optimized from a distance and speed estimation. In this case, it is sought to assign pulses $P_1 \ldots P_N$ to a plurality of transmit antennas $TX_1 \ldots TX_N$ in such a way that a best possible angle estimation is achieved using a time multiplexing sequence having a minimum overall transmit duration.

As in the scenario described above, for a best possible angle estimation, only two transmit antennas $TX_1$, $TX_2$, i.e., those two transmit antennas $TX_1$, $TX_2$, are used whose distance to one another is the maximum.

The individual pulses $P_1 \ldots P_N$ are divided between the two transmit antennas $TX_1$, $TX_2$, in such a way that the magnitude of the difference between the total energy radiated via first transmit antenna $TX_1$ and the total energy radiated via second transmit antenna $TX_2$ is a minimum. In the ideal case, an equal amount of transmit energy is radiated via the two antennas $TX_1$, $TX_2$. An allocation of transmit energies or pulses to transmit antennas $TX_1$, $TX_2$ does not have to be unique, so that there can exist a plurality of equally good allocations.

In a first step, the named optimal allocation is determined by a solution algorithm of the partitioning problem known from informatics. Because this is an NP-complete problem, the determination of an exact solution can be very time-intensive. However, for a small number of pulses N, the calculating time can be uncritical. For large numbers of pulses N, an approximation algorithm can be used having a polynomial runtime, which may indeed not yield the best solution, but advantageously has a significantly shorter runtime.

For each allocation of pulses $P_1 \ldots P_N$ to transmit antennas $TX_1 \ldots TX_N$, in a following second step the possible transmit times are determined for which there result optimal angle estimations. The transmit times result from the solution quantity of a lower-order linear equation system, so that there are infinitely many transmit times that result in an optimal angle estimation. The transmit times $\underline{t}$ result from the following mathematical equation:

$$[1/(\underline{1}^T \underline{\rho}^{(1)}) \cdot (\underline{\rho}^{(1)})^T - 1/(\underline{1}^T \underline{\rho}^{(2)}) \cdot (\underline{\rho}^{(2)})^T] \cdot \underline{t} = 0 \quad (9)$$

with the parameters:

$\underline{\rho}^{(1)}$ . . . Transmit energies of the pulses radiated via first transmit antenna $TX_1$, the ith element of $\underline{\rho}^{(1)}$ designating the energy of the ith transmitted pulse;

$\underline{\rho}^{(2)}$ . . . Transmit energies of the pulses radiated via second transmit antenna $TX_2$;

$\underline{1}$ . . . Vector having all elements equal to 1;

$\underline{1}^T \underline{\rho}^{(1)}$ . . . Sum over all elements in $\underline{\rho}^{(1)}$;

$\underline{1}^T \underline{\rho}^{(2)}$ . . . Sum over all elements in $\underline{\rho}^{(2)}$.

Finally, from these transmit times, those transmit times are determined that minimize the overall transmit time, so that, as a result, a lowest possible overall duration of the time multiplexing sequence is determined. This is carried out for example by a linear program that minimizes the last transmit time point $t_N$, subject to the condition that the difference between two successive transmit times $t_i$ and $t_{i+1}$ must not be smaller than the duration of the ith pulse. In order to determine from this the transmit times for the minimum overall transmit duration, all permutations of the original solutions for transmit times $\underline{t}$ have to be checked. With this method, in the indicated scenario, the time multiplexing sequences for an optimal angle estimation with minimum overall transmit time can always be determined.

Figure 4:
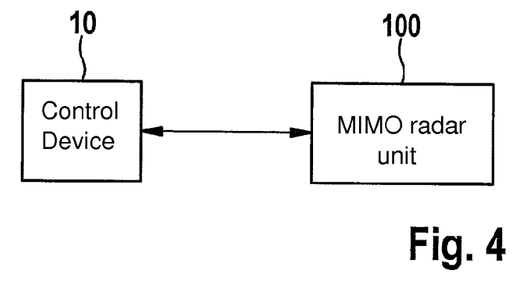
FIG. 4 shows a schematic diagram of a MIMO radar unit according to an example embodiment of the present invention.

FIG. 4 shows an example embodiment of a MIMO radar 100. In a control device 10, the method according to the present invention is preferably implemented in software, the transmitters $TX_1 \ldots TX_N$ (not shown) of MIMO radar unit 100 being controlled according to the principles indicated above.

Figure 5:
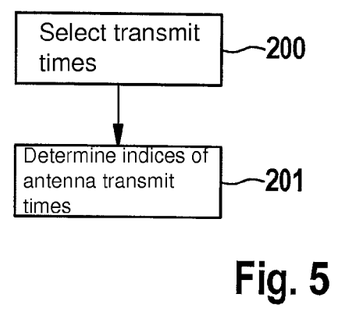
FIG. 5 shows a schematic sequence of the method according to an example embodiment of the present invention.

FIG. 5 shows a schematic sequence of the method according to the present invention for determining a time multiplexing sequence for an MIMO radar unit.

For simpler calculation, in a first step 200, the transmit times are selected without limitation of generality according to mathematical equation (1).

In a step 201, indices of transmit times of transmit antennas $TX_1$, $TX_2$ are determined from equation (1), the transmit times of first transmit antenna $TX_1$ and a number K of pulses transmitted via first transmit antenna $TX_1$ being determined iteratively from equations (2) through (5), and from Table 1.

Figure 6:
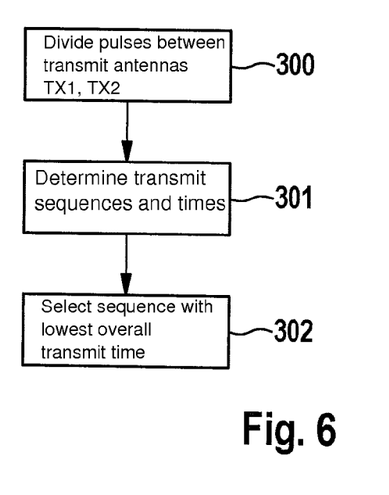
FIG. 6 shows a schematic sequence of a modification of the method according to an example embodiment of the present invention.

FIG. 6 shows a schematic sequence of a variant of the method according to the present invention for determining a time multiplexing sequence for a MIMO radar unit.

In a first step 300, the pulses are divided between transmit antennas $TX_1$, $TX_2$ in such a way that the magnitude of the difference between the transmit energy radiated via first transmit antenna $TX_1$ and the transmit energy radiated via second transmit antenna $TX_2$ is minimized.

In a second step 301, transmit sequences and transmit times for transmit antennas $TX_1$ and $TX_2$ are determined from equation (9).

Finally, in a third step 302, from the determined sequences, those sequences that have the lowest overall transmit time are selected.

In sum, the present invention proposes an improved method for providing time multiplexing sequences for transmit antennas of a linear or two-dimensional MIMO radar unit that includes antennas situated close to one another (collocated MIMO radar), enabling an angle estimation that is as precise as possible.

Advantageously, the design according to the present invention is distinguished in that algorithms are proposed that differ in their precondition or boundary condition, with which a transmit sequence of transmitters and their transmit times can be determined, with which object movements have essentially no influence on the angle estimation. A switching design according to example embodiments of the present invention provides a time multiplexer switching of a defined number of transmitters in such a way that a maximally optimized angle estimation is enabled, according to the Cramer-Rao bound.

Advantageously, the switching design according to the present invention can be realized both for one-dimensional and for two-dimensional arrays including an arbitrary number of transmit antennas $\geq 2$.

For the person skilled in the art, it will be understood that the described features of the present invention can be suitably modified and combined with one another without departing from the core idea of the present invention.

What is claimed is:

1. A method of a Multiple-Input Multiple-Output (MIMO) radar unit operating according to a time multiplexing sequence, the radar unit including a plurality of transmit antennas, the method comprising:

control circuitry operating the plurality of transmit antennas to provide a radar output signal based on transmit pulses of the transmit antennas, the operating including:

defining a number (N) of the pulses and a transmit duration of the pulses;

setting transmit times of the pulses according to: $t_i = i - (N+1)/2$, $1 \leq i \leq N$, wherein:

'i' is an index and '$t_i$' is an ith transmit time of the transmit antennas;

the setting of the transmit times includes iteratively determining the indices of the transmit times of a first one of a pair of the plurality of transmit antennas whose distance from each other is largest compared to all other pair-wise combinations of the plurality of transmit antennas;

the iterative determination is performed according to:

(i) $I_{LB} := I_{LB} > i$max; and (ii) $I_{LB} := i_{max} + 1$ otherwise      (a)

$I_{LB} = \lceil \sigma - \sigma_{M-1} + \frac{1}{2} \cdot (1 + (K-M) \cdot (K-M-N) + N) \rceil$; and      (b)

$I_{UB} = \lfloor (\sigma - \sigma_{M-1})/(K+1-M) - (K-1-M-N)/2 \rfloor$;      (c)

'$i_{max}$' is initially set to 0 and is otherwise a largest previously selected index;

'$I_{LB}$' is a minimum index of the transmit times;

'$I_{UB}$' is a maximum index of the transmit times;

'K' is a number of pulses transmitted via the first transmit antenna;

'M' is a current iteration;

'$\sigma$' is a sum of the transmit times of the first transmit antenna;

'$\sigma_{M-1}$' is a sum over the transmit times of the first transmit antenna after iteration M−1;

'$\lceil \, \rceil$' indicates a rounding up to a next largest whole number;

'$\lfloor \, \rfloor$' indicates a rounding down to a next smallest whole number;

relative values of N, $\sigma$, and K are determined from the following table:

| N | σ | K |
|---|---|---|
| 4K | 0 | N/2 |
| 2 + 4K | ±½ | N/2 |
| 1 + 2K | 0 | (N ± 1)/2; | and
the transmit times of a second one of the pair of the plurality of transmit antennas results at the times at which the first transmit antenna is not transmitting; and
controlling respective ones of the pair of the plurality of transmit antennas to transmit respective ones of the defined number of pulses at the defined transmit duration and at the respective transmit times set for the respective transmit antennas.

2. The method of claim 1, wherein N is selected as a multiple of four.

3. The method of claim 1, wherein:
there is a respective time difference between each pair of sequential ones of the transmit times;
the transmit times of the pulses are set so that:
all of the respective time differences are equal; or
a smallest one of the time differences of all of the pairs of sequential ones of the transmit times is larger than a difference between (a) the smallest one of all of the time differences and (b) a largest one of all of the time differences.

4. The method of claim 3, wherein a transmit energy of each pulse of the time multiplexing sequence transmitted by the selected transmit antennas is equal.

5. The method of claim 3, wherein the method includes defining the pulses according to a condition by which to minimize any difference between transmit energies of any pairwise combination of the pulses.

6. The method of claim 1, wherein:
there is a respective time difference between each pair of sequential ones of the transmit times; and
the setting of the transmit times is performed such that all time intervals between all pairwise combinations of sequential ones of the transmit times are the same.

7. The method of claim 6, wherein a transmit energy of each pulse of the time multiplexing sequence transmitted by the selected transmit antennas is equal.

8. The method of claim 6, wherein the method includes defining the pulses according to a condition by which to minimize any difference between transmit energies of any pairwise combination of the pulses.

9. The method of claim 1, wherein:
there is a respective time difference between each pair of sequential ones of the transmit times; and
the setting of the transmit times is performed according to an algorithm by which to minimize any difference between a largest and smallest of all time intervals between all pairwise combinations of sequential ones of the transmit times.

10. The method of claim 9, wherein a transmit energy of each pulse of the time multiplexing sequence transmitted by the selected transmit antennas is equal.

11. The method of claim 9, wherein the method includes defining the pulses according to a condition by which to minimize any difference between transmit energies of any pairwise combination of the pulses.

12. The method of claim 1, wherein a transmit energy of each pulse of the time multiplexing sequence transmitted by the selected transmit antennas is equal.

13. The method of claim 1, wherein the method includes defining the pulses according to a condition by which to minimize any difference between transmit energies of any pairwise combination of the pulses.

14. A Multiple-Input Multiple-Output (MIMO) radar unit, comprising:
a plurality of transmit antennas; and
control circuitry, wherein:
the control circuitry is configured to operate the plurality of transmit antennas to provide a radar output signal based on transmit pulses of the transmit antennas, the operation including:
defining a number (N) of the pulses and a transmit duration of the pulses;
setting respective transmit times of the pulses for respective ones of a pair of the plurality of transmit antennas whose distance from each other is largest compared to all other pair-wise combinations of the plurality of transmit antennas; and
controlling respective ones of the pair of the plurality of transmit antennas to transmit the respective ones of the defined number of pulses set for the respective transmit antennas at the defined transmit duration and at the respective transmit times;
the setting of the respective transmit times is performed according to: $t_i = i - (N+1)/2$, $1 \leq i \leq N$;
'i' is an index and '$t_i$' is an ith transmit time of the transmit antennas;
the setting of the respective transmit times includes iteratively determining the indices of the transmit times of a first one of the pair of the plurality of transmit antennas, with the transmit times of a second one of the pair of transmit antennas resulting at the times at which the first transmit antenna is not transmitting; and
the iterative determination is performed according to:

(i) $I_{LB} := I_{LB}$, if $I_{LB} > i_{max}$; and (ii) $I_{LB} := i_{max} + 1$ otherwise (a)

$I_{LB} = \lceil \sigma - \sigma_{M-1} + \frac{1}{2} \cdot (1 + (K-M) \cdot (K-M-N) + N) \rceil$; and (b)

$I_{UB} = \lfloor (\sigma - \sigma_{M-1})/(K+1-M) - (K-1-M-N)/2 \rfloor$; (c)

'$i_{max}$' is initially set to 0 and is otherwise a largest previously selected index
'$I_{LB}$' is a minimum index of the transmit times;
'$I_{UB}$' is a maximum index of the transmit times;
'K' is a number of pulses transmitted via the first transmit antenna;
'M' is a current iteration;
'σ' is a sum of the transmit times of the first transmit antenna;
'$\sigma_{M-1}$' is a sum over the transmit times of the first transmit antenna after iteration M−1;
'$\lceil \; \rceil$' indicates a rounding up to a next largest whole number;
'$\lfloor \; \rfloor$' indicates a rounding down to a next smallest whole number; and
relative values of N, σ, and K are determined from the following table:

| N | σ | K |
|---|---|---|
| 4K | 0 | N/2 |
| 2 + 4K | ±½ | N/2 |
| 1 + 2K | 0 | (N ± 1)/2. |

15. The MIMO radar unit of claim 14, wherein the MIMO radar unit is arranged for operation in an automotive application, and for, in accordance with the control, determination of at least one of distance, relative speed, and angle.

16. A non-transitory computer-readable medium on which are stored instructions that are executable by an electronic control device and that, when executed, cause the electronic control device to perform a method of a Multiple-Input Multiple-Output (MIMO) radar unit operating according to a time multiplexing sequence, the radar unit including a plurality of transmit antennas, the method comprising:
   operating the plurality of transmit antennas to provide a radar output signal based on transmit pulses of the transmit antennas, the operating including:
      defining a number (N) of the pulses and a transmit duration of the pulses;
      setting transmit times of the pulses according to: $t_i = i - (N+1)/2$, $1 \leq i \leq N$, wherein:
         'i' is an index and '$t_i$' is an ith transmit time of the transmit antennas;
         the setting of the transmit times includes iteratively determining the indices of the transmit times of a first one of a pair of the plurality of transmit antennas whose distance from each other is largest compared to all other pair-wise combinations of the plurality of transmit antennas;
         the iterative determination is performed according to:

(i) $I_{LB} := I_{LB}$, if $I_{LB} > i\text{max}$; and (ii) $I_{LB} := i_{max} + 1$ otherwise   (a)

$I_{LB} = \lceil \sigma - \sigma_{M-1} + \frac{1}{2} \cdot (1 + (K-M) \cdot (K-M-N) + N) \rceil$; and   (b)

$I_{UB} = \lfloor (\sigma - \sigma_{M-1})/(K+1-M) - (K-1-M-N)/2 \rfloor$;   (c)

'$i_{max}$' is initially set to 0 and is otherwise a largest previously selected index '$I_{LB}$' is a minimum index of the transmit times;
'$I_{UB}$' is a maximum index of the transmit times;
'K' is a number of pulses transmitted via the first transmit antenna;
'M' is a current iteration;
'$\sigma$' is a sum of the transmit times of the first transmit antenna;
'$\sigma_{M-1}$' is a sum over the transmit times of the first transmit antenna after iteration M−1;
'$\lceil \ \rceil$' indicates a rounding up to a next largest whole number;
'$\lfloor \ \rfloor$' indicates a rounding down to a next smallest whole number;
relative values of N, σ, and K are determined from the following table:

| N | σ | K |
|---|---|---|
| 4K | 0 | N/2 |
| 2 + 4K | ±½ | N/2 |
| 1 + 2K | 0 | (N ± 1)/2; | and
the transmit times of a second one of the pair of the plurality of transmit antennas results at the times at which the first transmit antenna is not transmitting; and
controlling respective ones of the pair of the plurality of transmit antennas to transmit respective ones of the defined number of pulses at the defined transmit duration and at the respective transmit times set for the respective transmit antennas.

* * * * *